(12) United States Patent
Tanabe et al.

(10) Patent No.: US 10,705,042 B2
(45) Date of Patent: Jul. 7, 2020

(54) MOBILE DEVICE, CONTROL METHOD, AND NON-TRANSITORY STORAGE MEDIUM

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 417 days.

(21) Appl. No.: 15/250,916

(22) Filed: Aug. 30, 2016

(65) Prior Publication Data

US 2017/0059503 A1 Mar. 2, 2017

(30) Foreign Application Priority Data

Aug. 31, 2015 (JP) ................................. 2015-170893

(51) Int. Cl.
*G01N 27/22* (2006.01)
*G06F 3/044* (2006.01)
(Continued)

(52) U.S. Cl.
CPC ........... *G01N 27/223* (2013.01); *G06F 3/044* (2013.01); *G06F 3/0416* (2013.01);
(Continued)

(58) Field of Classification Search
CPC ......... H04M 1/72583; H04M 1/72569; H04M 1/72577; H04M 2250/12; G06F 3/044; G06F 3/0416; G01N 27/223
See application file for complete search history.

(56) References Cited

U.S. PATENT DOCUMENTS 8,634,826 B1* 1/2014 Cope ................. H04W 8/22
370/328
2002/0198005 A1* 12/2002 Hilton ................ H04W 88/02
455/456.1

(Continued)

FOREIGN PATENT DOCUMENTS

| JP | 2012-123740 A | 6/2012 |
| JP | 2015-121481 A | 7/2015 |
| WO | 2012/108443 A1 | 8/2012 |

OTHER PUBLICATIONS

Extended European Search Report in EP Application No. 16185583.8, dated Jan. 30, 2017.
(Continued)

*Primary Examiner* — Son T Le
*Assistant Examiner* — Dustin R Dickinson
(74) *Attorney, Agent, or Firm* — Hauptman Ham, LLP

(57) ABSTRACT

A mobile device comprises a first sensor configured to acquire information for determining whether the device is in the water, a second sensor configured to acquire information for determining whether the device is in a state of being on-board, and at least one controller configured to perform control not to execute processing to determine whether the device is in the state of being on-board when the device is determined to be in the water, and to perform control to execute the processing to determine whether the device is in the state of being on-board when the device is not determined to be in the water.

5 Claims, 2 Drawing Sheets

(51) Int. Cl.
*H04M 1/725* (2006.01)
*G06F 3/041* (2006.01)

(52) U.S. Cl.
CPC ... *H04M 1/72569* (2013.01); *H04M 1/72577* (2013.01); *H04M 1/72583* (2013.01); *H04M 2250/12* (2013.01)

(56) References Cited

U.S. PATENT DOCUMENTS

| | | | |
|---|---|---|---|
| 2010/0141399 A1* | 6/2010 | Swope | H04M 1/72569 340/10.33 |
| 2011/0105097 A1* | 5/2011 | Tadayon | H04M 3/53 455/418 |
| 2012/0146924 A1 | 6/2012 | Inoue | |
| 2012/0270611 A1 | 10/2012 | Choi et al. | |
| 2014/0191873 A1* | 7/2014 | Kreiner | H04M 1/72536 340/604 |
| 2015/0062069 A1 | 3/2015 | Shin et al. | |
| 2015/0087264 A1* | 3/2015 | Goyal | G01S 19/34 455/411 |
| 2016/0320186 A1 | 11/2016 | Tanabe et al. | |

OTHER PUBLICATIONS

Office Action in JP Application No. 2015-170893, dated Feb. 7, 2017, for which an explanation of relevance is attached.

\* cited by examiner

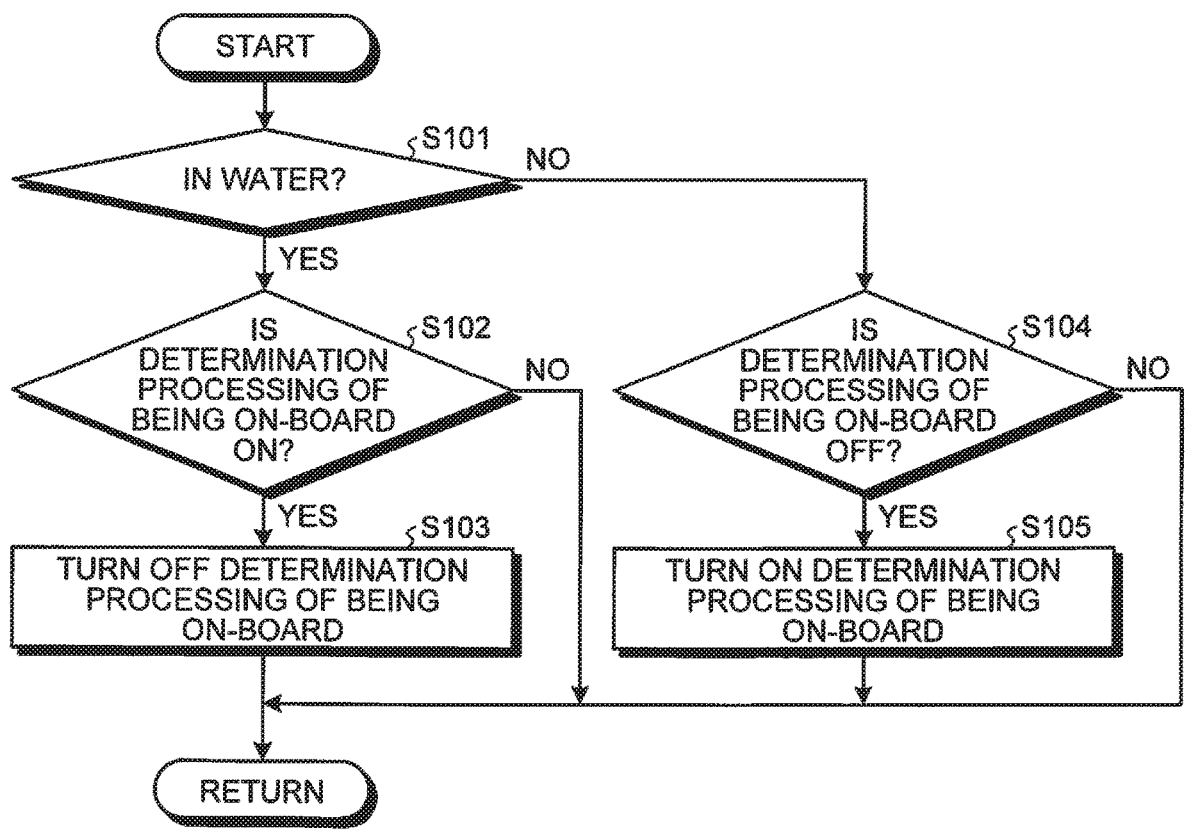

MOBILE DEVICE, CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2015-170893 filed in Japan on Aug. 31, 2015.

FIELD

The present application relates to a mobile device, a control method, and a non-transitory storage medium.

BACKGROUND

Conventionally, there have been electronic devices that can detect water that has adhered thereto. Conventional technologies are described in Japanese Patent Application Laid-open No. 2012-123740, for example.

The processing executed in accordance with the detection of water has room for improvement.

SUMMARY

It is an object of the present disclosure to at least partially solve the problems in the conventional technology.

According to one aspect, there is provided a mobile device, comprising: a first sensor configured to acquire information for determining whether the device is in the water; a second sensor configured to acquire information for determining whether the device is in a state of being on-board; and at least one controller configured to perform control not to execute processing to determine whether the device is in the state of being on-board when the device is determined to be in the water, and to perform control to execute the processing to determine whether the device is in the state of being on-board when the device is not determined to be in the water.

According to one aspect, there is provided a control method executed by a mobile device that comprises a first sensor configured to acquire information for determining whether the device is in the water and a second sensor configured to acquire information for determining whether the device is in a state of being on-board, the control method comprising: determining whether the device is in the water; performing control not to execute processing to determine whether the device is in the state of being on-board when the device is determined to be in the water; and performing control to execute the processing to determine whether the device is in the state of being on-board when the device is not determined to be in the water.

According to one aspect, there is provided a non-transitory storage medium that stores a control program for causing a mobile device that comprises a first sensor configured to acquire information for determining whether the device is in the water and a second sensor configured to acquire information for determining whether the device is in a state of being on-board to execute: determining whether the device is in the water; performing control not to execute processing to determine whether the device is in the state of being on-board when the device is determined to be in the water; and performing control to execute the processing to determine whether the device is in the state of being on-board when the device is not determined to be in the water.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 2 is a flowchart of a procedure of processing by the smartphone according to the embodiment.

DETAILED DESCRIPTION OF THE PREFERRED EMBODIMENTS

Figure 1:
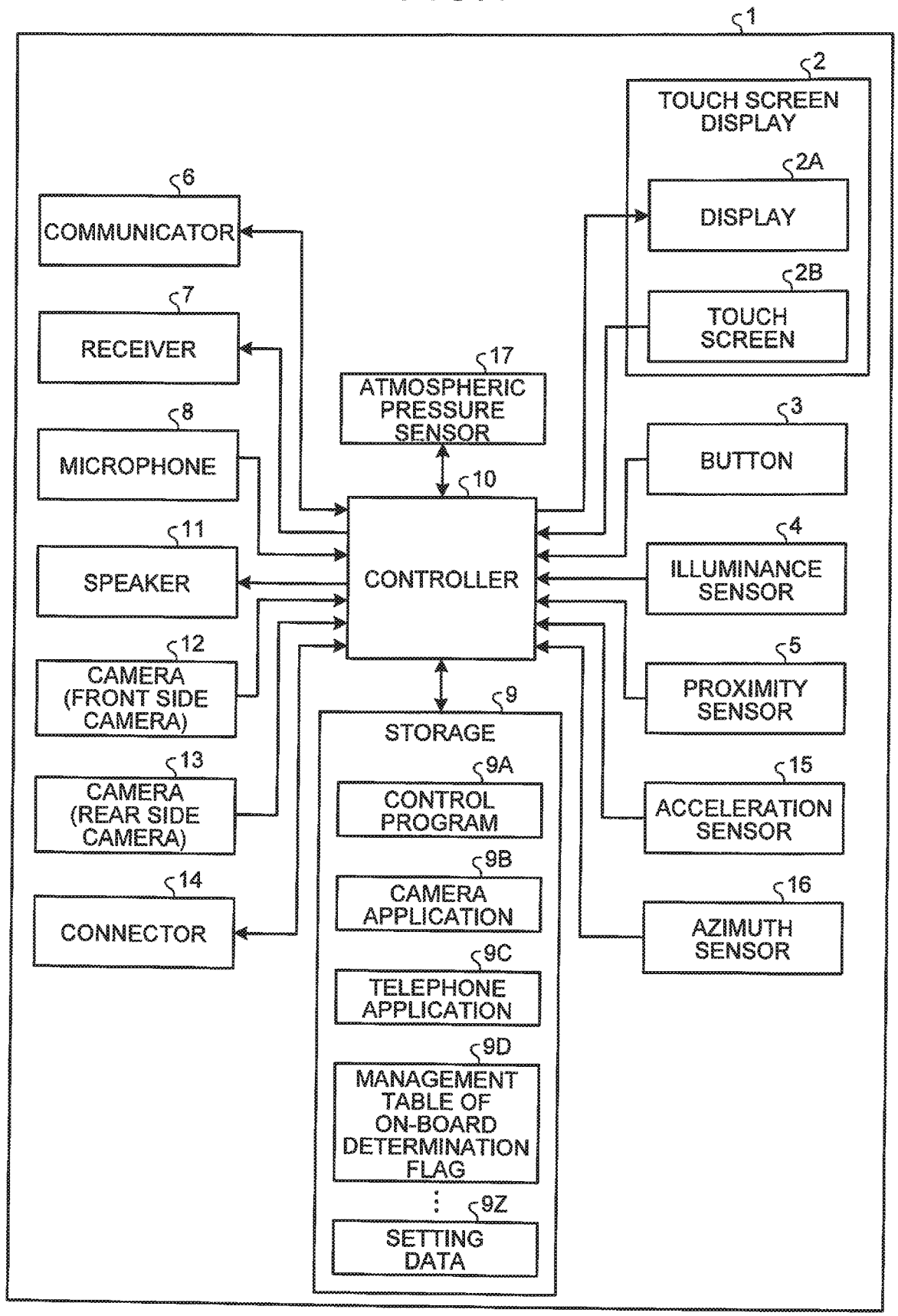
FIG. 1 is a block diagram of a functional configuration of a smartphone according to an embodiment.

The following describes a plurality of embodiments for performing a mobile device, a control method, and a non-transitory storage medium according to the present application in detail with reference to the accompanying drawings. The following describes a smartphone as an example of the mobile device according to the present application.

The following describes an example of a functional configuration of a smartphone 1 according to an example of embodiments with reference to FIG. 1. FIG. 1 is a block diagram of the functional diagram of the smartphone 1. In the following description, similar components may be denoted by the same symbols. Furthermore, a duplicate description may be omitted. In the following description, the smartphone 1 may be referred to as a "device."

As illustrated in FIG. 1, the smartphone 1 includes a touch screen display 2, a button 3, an illuminance sensor 4, a proximity sensor 5, a communicator 6, a receiver 7, a microphone 8, a storage 9, a controller 10, a speaker 11, a camera 12, a camera 13, a connector 14, an acceleration sensor 15, an azimuth sensor 16, and an atmospheric pressure sensor 17.

The touch screen display 2 includes a display 2A and a touch screen 2B. The display 2A and the touch screen 2B may be positioned to overlap with each other, positioned adjacent to each other, or positioned separated from each other, for example. When the display 2A and the touch screen 2B are positioned to overlap with each other, one or a plurality of sides of the display 2A are not necessarily along any side of the touch screen 2B, for example. The touch screen display 2 is an example of a display module.

The display 2A includes a display device such as a liquid crystal display (LCD), an organic electro-luminescence display (OELD), or an inorganic electro-luminescence display (IELD). The display 2A displays objects such as letters, images, symbols, and figures within a screen. Examples of the screen containing the objects such as letters, images, symbols, and figures that the display 2A displays include a screen called a lock screen, a screen called a home screen, and an application screen displayed while an application is being executed. The home screen may also be called a desktop, an idle screen, a stand-by screen, a standard screen, an application list screen, or a launcher screen. The display 2A is an example of the display module.

The touch screen 2B detects contact or proximity of a finger, a pen, a stylus pen, or the like against the touch screen 2B. When a plurality of fingers, pens, stylus pens, or the like are in contact with or close to the touch screen 2B, the touch screen 2B can detect positions of the contacts on the touch screen 2B. The fingers, pens, stylus pens, or the like detected by the touch screen 2B may be referred to as "finger." The position in contact with or close to the finger, detected by the touch screen 2B, may be referred to as "detection position." The touch screen 2B notifies the controller 10 of the contact of the finger with the touch screen 2B together with the detection position. The touch screen display 2 including the touch screen 2B can perform operation that can be performed by the touch screen 2B. In other words, the touch screen display 2 may perform the operation that the touch screen 2B performs. In an embodiment, the touch screen 2B acquires information for determining whether the device is in the water. When employing an electrostatic capacitance system as a detection system, the touch screen 2B can measure changes in electrostatic capacitance as the information for determining whether the device is in the water. The touch screen 2B repeatedly applies certain signals to a plurality of respective sensor electrodes arranged across the touch screen 2B in a grid manner and reads output values from the respective sensor electrodes. With this operation, the touch screen 2B can measure the changes in electrostatic capacitance at the detection points on the touch screen 2B. When employing a resistance film system or a load detection system as another detection system, the touch screen 2B may detect changes in magnitude of voltage as the information for determining whether the device is in the water, for example. When employing a surface acoustic wave system as another detection system, the touch screen 2B may detect attenuation of a surface acoustic wave transmitted by the device as the information for determining whether the device is in the water, for example. When employing an infrared system as another detection system, the touch screen 2B may detect attenuation of infrared light transmitted by the device as the information for determining whether the device is in the water, for example. The touch screen 2B is an example of a first sensor.

The controller 10 determines type of a gesture based on at least one of a contact detected by the touch screen 2B, a position at which a contact is detected, a change in a position at which a contact is detected, an interval during which contacts are detected, and the number of times contacts are detected. The smartphone 1 including the controller 10 can execute operation that can be performed by the controller 10. In other words, the smartphone 1 may perform the operation that the controller 10 performs. The gesture is an operation performed against the touch screen 2B using the finger. The operation performed against the touch screen 2B may be performed against the touch screen display 2 including the touch screen 2B. Examples of the gesture that the controller 10 determines via the touch screen 2B include, but are not limited to, touch, long touch, release, swipe, tap, double tap, long tap, drag, flick, pinch-in, and pinch-out.

The button 3 receives operation input from a user. The number of the button 3 may be one or more.

The illuminance sensor 4 detects illuminance. The illuminance is a value of a light bundle entering a unit area of a measuring plane of the illuminance sensor 4. The illuminance sensor 4 is used for adjustment of luminance of the display 2A, for example.

The proximity sensor 5 detects presence of a nearby object in a noncontact manner. The proximity sensor 5 detects the presence of the object based on a change in a magnetic field, a change in return time of a reflective wave of an ultrasonic wave, or the like. The proximity sensor 5 detects that the display 2A and a face have approached each other, for example. The illuminance sensor 4 and the proximity sensor 5 may be configured as one sensor. The illuminance sensor 4 may be used as a proximity sensor.

The communicator 6 performs communication by wireless communication. Examples of a wireless communication standard supported by the communication unit 6 include, but are not limited to, cellular phone communication standards such as 2G, 3G, and 4G and short-range wireless communication standards. Examples of the cellular phone communication standards include, but are not limited to, Long Term Evolution (LTE), Wideband Code Division Multiple Access (W-CDMA), Worldwide Interoperability for Microwave Access (WiMAX) (registered trademark), Wideband Code Division Multiple Access 2000 (CDMA2000), Personal Digital Cellular (PDC), Global System for Mobile Communications (GSM) (registered trademark), and Personal Handy-phone System (PHS). Examples of the short-range wireless communication standards include, but are not limited to, Institute of Electrical and Electronics Engineers 802.11 (IEEE802.11), Bluetooth (registered trademark), Infrared Data Association (IrDA), Near Field Communication (NFC), and Wireless Personal Area Network (WPAN). Examples of the communication standard of WPAN include, but are not limited to, ZigBee (registered trademark). The communicator 6 may support one or a plurality of the communication standards described above.

The receiver 7 outputs sound signals transmitted from the controller 10 as sound. The receiver 7 can output sound of a video and sound of music reproduced by the smartphone 1 and voice of a partner on calling, for example. The microphone 8 converts voice of the user or the like into sound signal and transmits the sound signal to the controller 10.

The storage 9 can store therein computer programs and data. The storage 9 may be used as a work area that temporarily stores therein processing results of the controller 10. The storage 9 may include any non-transitory storage medium such as a semiconductor storage medium or a magnetic storage medium. The storage 9 may include a plurality of types of storage media. The storage 9 may include a combination of a storage medium such as a memory card, an optical disc, or a magneto-optical disc and a reading apparatus for the storage medium. The storage 9 may include a storage device used as a temporary storage area such as a random access memory (RAM).

The computer programs stored in the storage 9 include an application executed in the foreground or the background and a basic program (not illustrated) that supports operation of the application. A screen of the application is displayed on the display 2A when being executed in the foreground, for example. Examples of the basic program include, but are not limited to, an operating system (OS). The application program and the basic program may be installed in the storage 9 via wireless communication by the communicator 6 or a non-transitory storage medium.

The storage 9 can store therein a control program 9A, a camera application 9B, a telephone application 9C, a management table of an on-board determination flag 9D, setting data 9Z, and the like.

The control program 9A can provide a function of determining whether the device is in the water based on information acquired by the first sensor. The first sensor includes at least either the touch screen 2B or the atmospheric pressure sensor 17. The controller 10 that executes the control program 9A implements processing to determine whether the device is in the water using at least either information acquired by the touch screen 2B or information acquired by the atmospheric pressure sensor 17. The controller 10 that executes the control program 9A implements the processing to determine whether the device is in the water based on whether a change in electrostatic capacitance at the detection points on the touch screen 2B matches a predetermined change when the device is in the water with certain accuracy. The controller 10 that executes the control program 9A implements the processing to determine whether the device is in the water based on whether a change (inclination) in atmospheric pressure acting on the device per unit time matches an atmospheric pressure change when the device is in the water with certain accuracy.

The control program 9A can provide a function of determining whether the device is in a state of being on-board based on information acquired by a second sensor. The state of being on-board includes a state in which the user of the smartphone 1 carrying the smartphone 1 is riding in a vehicle. The second sensor includes the acceleration sensor 15. The controller 10 that executes the control program 9A implements processing to determine whether the device is in the state of being on-board based on a detection result of the acceleration sensor 15.

When it is determined that the device is in the water based on the information acquired by the first sensor, the control program 9A can provide a function that performs control not to execute the processing to determine whether the device is in the state of being on-board. In contrast, when it is not determined that the device is in the water based on the information acquired by the first sensor, the control program 9A can provide a function that performs control to execute determination processing of being on-board. When the control is performed not to execute the processing to determine whether the device is in the state of being on-board (hereinafter, called determination processing of being on-board), the control may be provided by various kinds of methods such as making the determination processing of being on-board in a non-executable state or automatically discarding the detection result of the acceleration sensor 15 required for the determination processing of being on-board.

The camera application 9B can provide a function of performing photographing, editing, management, and the like of still images and moving images. The telephone application 9C can provide a telephone call function for telephone call through wireless communication.

The management table of the on-board determination flag 9D manages whether the device is in a state in which the determination processing of being on-board is executable. When the determination processing of being on-board is executed, the controller 10 that executes the control program 9A refers to the on-board determination flag written into the management table of the on-board determination flag 9D and determines whether the determination processing of being on-board is to be executed. When the on-board determination flag written into the management table of the on-board determination flag 9D is "on," the controller 10 that executes the control program 9A executes the determination processing of being on-board. In contrast, when the on-board determination flag written into the management table 9D of the on-board determination flag is "off," the controller 10 that executes the control program 9A does not execute the determination processing of being on-board.

The setting data 9Z includes various kinds of data for use in the processing executed based on the functions provided by the control program 9A and the like. The setting data 9Z contains an actual measurement result of the acceleration sensor 15 when the user of the smartphone 1 carrying the smartphone 1 is in a state of being on-board as reference information for the on-board determination. The reference information for the on-board determination includes an acceleration pattern including a direction and magnitude of acceleration acting on the smartphone 1 and time-series change of the direction and the magnitude of the acceleration. The setting data 9Z contains data on changes in electrostatic capacitance for determining whether the device is in the water. The setting data 9Z contains data on a predetermined condition of an atmospheric pressure value for determining whether the device is in the water.

The controller 10 includes a processor. Examples of the processor include, but are not limited to, a central processing unit (CPU), a system-on-a-chip (SoC), a micro control unit (MCU), a field-programmable gate array (FPGA), and a coprocessor. The controller 10 integrally controls the operation of the smartphone 1 to implement various kinds of functions. The controller 10 is an example of a controller.

Specifically, the controller 10 executes commands contained in the computer programs stored in the storage 9 while referring to the data stored in the storage 9 as needed. The controller 10 controls functional modules in accordance with the data and the commands and thereby implements the various kinds of functions. Examples of the functional modules include, but are not limited to, at least one of the display 2A, the communicator 6, the microphone 8, and the speaker 11. The controller 10 may change the control in accordance with detection results of detection modules. Examples of the detection modules include, but are not limited to, at least one of the touch screen 2B, the button 3, the illuminance sensor 4, the proximity sensor 5, the microphone 8, the camera 12, the camera 13, the acceleration sensor 15, the azimuth sensor 16, and the atmospheric pressure sensor 17.

The controller 10 executes the control program 9A and thereby determines whether the device is in the water based on the information acquired by the first sensor. The controller 10 executes the control program 9A and thereby performs the determination processing based on the information acquired by the second sensor. The controller 10 executes the control program 9A and thereby performs control not to execute the vehicle determination processing of being on-board when it is determined that the device is in the water and performs control to execute the determination processing of being on-board when it is not determined that the device is in the water.

The speaker 11 includes a sound output module. The speaker 11 outputs sound signals transmitted from the controller 10 as sound. The speaker 11 may output a ringtone and music, for example. One of the receiver 7 and the speaker 11 may also function as the other.

The camera 12 and the camera 13 can convert photographed images into electric signals. The camera may be a front side camera that photographs an object facing the display 2A. The camera 13 may be a rear side camera that photographs an object facing the opposite face of the display 2A. The camera 12 and the camera 13 may be mounted on the smartphone 1 functionally and physically integrated as a camera unit that can use an front side camera and an rear side camera in a switchable manner.

The connector 14 is a terminal to which another apparatus is connected. The connector 14 may be a general-purpose terminal such as Universal Serial Bus (USB), High-Definition Multimedia Interface (HDMI) (registered trademark), Light Peak (Thunderbolt (registered trademark)), or an earphone/microphone connector. The connector 14 may be an exclusive terminal such as a Dock connector. Examples of the apparatus connected to the connector 14 include, but are not limited to, an external storage, a speaker, and a communication apparatus.

The acceleration sensor 15 can measure the direction and the magnitude of the acceleration acting on the smartphone 1. The acceleration sensor 15 is an example of the second sensor. The azimuth sensor 16 detects orientation of geomagnetism and can measure orientation (azimuth) of the smartphone 1 based on the orientation of geomagnetism, for example.

The atmospheric pressure sensor 17 can measure atmospheric pressure acting on the smartphone 1. The atmospheric pressure sensor 17 is an example of the first sensor.

The smartphone 1 may include a global positioning system (GPS) receiver and a vibrator in addition to the functional modules. The GPS receiver can receive radio signals with a certain frequency band from GPS satellites. The GPS receiver performs demodulation processing on the received radio signals and transmits the processed signals to the controller 10. The GPS receiver supports the arithmetic processing of the current position of the smartphone 1. The vibrator vibrates part or the whole of the smartphone 1. The vibrator has a piezoelectric element, an eccentric motor, or the like in order to generate vibrations. Mounted on the smartphone 1 are functional modules such as a battery that is inevitably used for maintaining the functions of the smartphone 1 and a controller that is inevitably used for implementing the control of the smartphone 1.

The following describes a procedure of processing executed by the smartphone 1 according to the embodiment with reference to FIG. 2. FIG. 2 is a flowchart of an example of the processing by the smartphone according to the embodiment. The processing illustrated in FIG. 2 is implemented by causing the controller 10 to execute the control program 9A stored in the storage 9. The processing illustrated in FIG. 2 is repeatedly executed unless an operation to end the processing illustrated in FIG. 2 is performed while the smartphone 1 is being activated.

As illustrated in FIG. 2, the controller 10 determines whether the device is in the water using at least either a detection result of the touch screen 2B or a detection result of the atmospheric pressure sensor 17 (Step S101).

When it is determined that the device is in the water (Yes at Step S101), the controller 10 refers to the on-board determination flag of the determination processing of being on-board recorded in the management table of the on-board determination flag 9D and determines whether the on-board determination flag of the determination processing of being on-board is "on" (Step S102).

When the on-board determination flag of the determination processing of being on-board is "on" as a result of the determination (Yes at Step S102), the controller 10 rewrites the on-board determination flag of the vehicle determination processing of being on-board recorded in the management table of the on-board determination flag 9D to "off" (Step S103) and returns to the determination at Step S101.

In contrast, when the on-board determination flag of the determination processing of being on-board is not "on" as a result of the determination at Step S102 (No at Step S102), the controller 10 returns to the determination at Step S101.

At Step S101, when it is not determined that the device is in the water (No at Step S101), the controller 10 refers to the on-board determination flag of the determination processing of being on-board recorded in the management table of the on-board determination flag 9D and determines whether the on-board determination flag of the determination processing of being on-board is "off" (Step S104).

When the on-board determination flag of the determination processing of being on-board is "off" as a result of the determination (Yes at Step S104), the controller 10 rewrites the on-board determination flag of the determination processing of being on-board recorded in the management table of the on-board determination flag 9D to "on" (Step S105) and returns to the determination at Step S101.

In contrast, when the on-board determination flag of the determination processing of being on-board is not "off" as a result of the determination at Step S104 (No at Step S104), the controller 10 returns to the determination at Step S101.

In embodiments, the smartphone 1 performs control not to execute the determination processing of being on-board when it is determined that the device is in the water and performs control to execute the determination processing of being on-board when it is not determined that the device is in the water. Consequently, according to embodiments, the smartphone 1 can be prevented from erroneously determining the state of being on-board when the device is in the water. The smartphone 1 can be prevented from executing the processing based on the determination that the device is on-board, in the processing executed in accordance with the detection of water. Processing accuracy of, for example, applications that record user's daily activities such as the amount of steps, going up and down stairs and slopes, getting on/in a vehicle, consumed calories, and a heart rate can be improved. The smartphone 1 in embodiments described above can thus improve the processing executed in accordance with the detection of water.

The processing described in embodiments can also be applied similarly to other electronic devices intended to be operated in the water other than the smartphone 1.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device, comprising:
    a first sensor configured to acquire first information, the first sensor including a touch screen, the first information including changes in electrostatic capacitance of the touch screen;
    a second sensor configured to acquire second information; and
    at least one controller configured to
        determine, based on the first information, whether or not the device is in water,
        in response to determining, based on the first information, that the device is in water,
            refrain from determining whether the device is in a vehicle while maintaining the device being powered on, and
        in response to determining, based on the first information, that the device is not in water,
            determine, based on the second information, whether the device is in a vehicle.

2. The device according to claim 1, wherein
the first sensor further includes an atmosphere pressure sensor, and
the second sensor includes at least one of an acceleration sensor and an azimuth sensor.

3. The device according to claim 1, wherein
the at least one controller is configured to,
    in response to determining, based on the first information, that the device is in water, discard at least a portion of the second information.

4. A control method executed by a device that comprises a first sensor, a second sensor and at least one controller, the control method comprising:

acquiring, by the first sensor, first information, the first sensor including a touch screen, the first information including changes in electrostatic capacitance of the touch screen;

acquiring, by the second sensor, second information;

determining, by the at least one controller and based on the first information, whether or not the device is in water;

in response to determining, based on the first information, that the device is in water,
refraining from determining, by the at least one controller, whether the device is in a vehicle while maintaining the device being powered on; and in response to determining, based on the first information, that the device is not in water,
determining, by the at least one controller and based on the second information, whether the device is in a vehicle.

5. A non-transitory storage medium that stores a control program for causing a device that comprises a first sensor, a second sensor and at least one controller, to execute:

acquiring, by the first sensor, first information, the first sensor including a touch screen, the first information including changes in electrostatic capacitance of the touch screen;

acquiring, by the second sensor, second information;

determining, by the at least one controller and based on the first information, whether or not the device is in water;

in response to determining, based on the first information, that the device is in water,
refraining from determining, by the at least one controller, whether the device is in a vehicle while maintaining the device being powered on; and in response to determining, based on the first information, that the device is not in water,
determining, by the at least one controller and based on the second information, whether the device is in a vehicle.

* * * * *